United States Patent Office 2,852,426
Patented Sept. 16, 1958

2,852,426
NEMATOCIDES CONTAINING CARBOXYLIC ACIDS AND THEIR ESTERS AND METHOD

Roy E. Stansbury, Bartlesville, Okla., assignor to Phillips Petroleum Company, a corporation of Delaware No Drawing. Application December 14, 1953
Serial No. 398,209

31 Claims. (Cl. 167—22)

This invention relates to nematocidal compositions or compounds and to a nematocidal method employing the same. In one aspect, the invention relates to carboxylic acids and their esters of saturated alcohols as nematocides. In another aspect the invention relates to a method for killing nematodes by applying to the soil said carboxylic acids and/or their esters of saturated alcohols. Other aspects of the invention are apparent from this disclosure and the claims.

Nematodes are a class of unsegmented worms belonging to the phylum Nemathelminthes. Certain nematodes, mainly belonging to the genera Heterodera and Anguillulina (Tylenchus) are important as agricultural pests. These nematodes infest soil and attack the roots, stems, leaves, or ears of cultivated plants of various kinds, and can cause great deterioration or even destruction of the crop. It has been estimated that the annual loss in the United States alone due to such plant parasites amounts to several hundred millions of dollars.

According to the invention, carboxylic acids and their saturated alcohol esters are effective materials for treating soil and for the control of nematodes found therein. Compounds represented by the formulas as follows are operative within the scope of the invention:

(I)
$$R-\overset{O}{\underset{\|}{C}}-O-R^2$$

and (II) 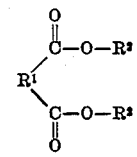

and (III)
$$R^3-\overset{O}{\underset{\|}{C}}-O-R^4$$

and (IV) 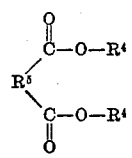

and (V)
$$R^6-\overset{O}{\underset{\|}{C}}-O-R^2$$

and (VI) 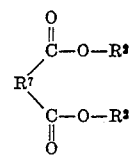

and (VII) 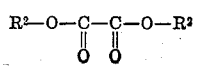

wherein R is a monovalent aliphatic hydrocarbon radical containing from 6–10 carbon atoms; $R^1$ is a divalent aliphatic hydrocarbon radical containing from 5–9 carbon atoms; $H^2$ is selected from the group consisting of hydrogen and a saturated hydrocarbon radical containing from 1–6 carbon atoms; $R^3$ is a monovalent aliphatic hydrocarbon radical containing 3–5 carbon atoms; $R^4$ is selected from the group consisting of hydrogen and a saturated hydrocarbon radical containing from 1–3 carbon atoms; $R^5$ is a divalent aliphatic hydrocarbon radical containing 2–4 carbon atoms; $R^6$ is selected from the group consisting of hydrogen and a monovalent aliphatic hydrocarbon radical containing 1–2 carbon atoms; $R^7$ is a divalent aliphatic hydrocarbon radical containing a single carbon atom, the radicals represented by $R^2$ can be different, the radicals represented by $R^4$ can be different, and hydroxy-substituted derivatives of said compounds. The monovalent and divalent aliphatic hydrocarbon radicals, R, $R^1$, $R^3$, $R^5$, $R^6$, and $R^7$, can be saturated or unsaturated.

According to the present invention, the underground part of crops are protected against attack by soil-inhabiting nematodes by treating the soil with such an acid or ester. The chemical, when distributed through the soil, accomplishes the rapid control of such nematodes as *Heterodera marioni, Belonolaimus gracilis* and *Trichodorus primitivus*.

In a preferred form of this invention, the soil is treated with a saturated ester of sebacic acid, such as dimethyl sebacate, diethyl sebacate, and the like. It has been found that these esters are capable at low concentrations of destroying soil nematodes within a short period of time when brought into contact with them. Moreover, these esters are substantially nonphytotoxic at the concentrations used for nematode control. Heretofore, one of the serious disadvantages of nematocides has been their phytotoxicity toward growing plants. This property necessitated a frequently undesirable waiting period between treatment of the soil and seeding. It also precluded their use on growing plants that had developed infestations of nematodes. I have now found that these esters can be applied to soil immediately before or after or simultaneously with the planting of seeds at concentrations sufficient to kill nematodes present in the soil without adversely affecting the sprouting of the seed and subsequent growth of the seedling. Moreover, roots of growing plants that have developed infestations of nematodes can be brought into direct contact with these esters in sufficient concentrations to kill the nematodes without adversely affecting the plant. This results in the saving of many crops which heretofore could not have been treated with nematocides because of the phytotoxic qualities of the known nematocides.

An especially valuable use of these compounds is in their application to the roots of established perennial plants, such as citrus trees, rose bushes, and ornamental shrubs, which, because of their long life, cannot be protected against nematodes by treatment of the soil solely before the planting.

The esters of other carboxylic aliphatic acids also make effective nematocides, particularly those acids containing from 2 to 11 carbon atoms. Examples of these esters are dihexyl undecanedioate, dimethyl pimelate, diethyl 3-heptenedioate, di-tert-butyl 2,3-dimethyl-2-octenedioate, diethyl 3-methyl sebacate, diethyl azelate, dipropyl suberate, dimethyl 3-isopropyl pimelate, dimethyl 6-isopropyl-3-methyl pimelate, ethyl oxalate, ethyl malonate, hexyl malonate, ethyl maleate, isopropyl succinate, methyl oxalate, propyl adipate, and the like.

Effective also are the half esters of the dicarboxylic acids, such as methyl hydrogen pimelate, ethyl hydrogen 3-hendecenedioate, hexyl hydrogen sebacate, isobutyl hydrogen suberate, methyl hydrogen oxalate, methyl hydrogen adipate, hexyl hydrogen malonate, and also the esters of saturated and unsaturated monocarboxylic acids, such as amyl enanthate, butyl caprylate, methyl hendecenoate, isobutyl β-ethylenanthate, ethyl caprate, methyl 2,3-dimethyl-2-heptenoate, ethyl pelargonate, n-butyl acetate, ethyl butyrate, n-propyl propionate, methyl crotonate, methyl formate, isohexyl acrylate, ethyl α-methylvalerate, and the like.

Also useful as nematocides are the acids themselves, such as pimelic acid, caprylic acid, azelaic acid, sebacic acid, hendecanoic acid, and 6-heptenoic acid, 3-hendecenedioic, β-ethyl ϵ-methylenanthic acid, α-isopropyl-δ-methyl pimelic acid, propionic acid, acrylic acid, 2-butenoic acid, malonic acid, maleic acid, adipic acid, caproic acid, oxalic acid, oxalic acid dihydrate, and the like.

The hydroxy-substituted derivatives of the acids described above, and the esters of such hydroxy acids are also within the scope of this invention. Included in this group of compounds are such materials as 3-hydroxy-4-heptenoic acid, 10, 11-dihydroxyhendecanoic acid, dimethyl 4-hydroxysebacate, diethyl 3-hydroxy-3-isopropyl suberate, lactic acid, butyl lactate, ethyl tartrate, propyl malate, tartronic acid, propyl α-hydroxycaproate, and the like.

While I prefer to use esters made from dicarboxylic acids containing from 2 to 11 carbon atoms and alcohols containing from 1 to 6 carbon atoms, esters made from dihydric alcohols and monocarboxylic acids are also useful as nematocidal agents. Examples of such compounds are 1,9-nonanediol dipropionate, 1,10-decanediol acetate, 1,7-heptanediol dicaproate, 3-octene-1,8-diol diformate, 1,3-propanediol dicaprylate, and the like.

In carrying out my invention any suitable method may be employed for distributing the chemical through the soil. The nematocide may be applied to the soil in the form of a solution in a liquid carrier, as an emulsion in water, or as a dispersion in or on a finely divided carrier. Undiluted application can be practiced. However, it is not now preferred because it does not permit as great a uniformity of application or the ease of penetration which are obtained with diluents.

Two conventional methods for incorporating solutions and emulsions into soil which can be used in my invention are the spot injection and the conventional drilling techniques. In the injection operation, a syringe-type applicator or other suitable device is employed to deliver a measured quantity of the toxic material into the soil at spaced intervals. In drilling operations, a convenient apparatus consists of an applicator embodying a plurality of steel blades or shanks, to which are attached tubes connecting with a reservoir containing the toxic material in a liquid vehicle. The latter is delivered through the tube or tubes under pressure at a point behind each blade and below the surface of the soil. The assemblage may be constructed as an integral portion of a tractor, or mounted on a carriage and drawn through the field in any convenient fashion to accomplish the distribution of the toxicant.

In using the drilling or injection technique with the compounds of my invention it is desirable that the toxicant be deposited at from 2 to 8 inches below the soil surface, and that the distance from one point of deposit to the next be not greatly in excess of 2 to 6 inches. In either injection or drilling operations, it is preferred that the soil disturbed by the introduction of the toxicant be replaced and packed. Following injection, it is generally sufficient for the operator to press the soil back into place. In drilling operations, a broad wheel, drag, or other device may be rigged behind each delivery tube to press down the soil and cover the freshly deposited toxicant.

Emulsion compositions in which the nematocide is dispersed in water can be applied substantially as described above. In addition, such emulsions can be introduced into irrigation water or applied directly to the surface of the soil, preferably followed by rototilling.

When the nematocidal ester or acid is applied in solution form to the soil, it is generally preferred to use a solvent which has little or no phytotoxic properties, such as the mixture of isoparaffinic hydrocarbons known as Soltrol, and which can be obtained by the hydrofluoric acid alkylation of an isoparaffin with an olefin, the straight-chain hydrocarbons containing no more than 16 carbon atoms, acetone, or the like. The solvent may be one which itself has nematocidal properties. Such a solvent is the mixture of olefinic hydrocarbons produced during hydrocarbon cracking which is disclosed as a nematocide in Serial Number 351,055, April 24, 1953, by Lyle D. Goodhue and Roy E. Stansbury, now abandoned. Solutions are usually applied by the drilling or injection method. In said application there are set forth and claimed nematocidal compositions of matter containing at least one normally liquid olefinic hydrocarbon material selected from the group consisting of substituted and unsubstituted acyclic mono- and polyolefins, substituted and unsubstituted cyclic mono- and polyolefins, residual by-product oils formed during the catalytic dehydrogenation of a $C_4$ hydrocarbon to produce a less saturated $C_4$ hydrocarbon, a product fraction of low pressure hydrocarbon cracking and an olefinic polymeric product of polymerization of a monoolefin hydrocarbon. Specifically there are set forth as being nematocidal in character olefinic hydrocarbon material resulting from low pressure hydrocarbon cracking and having a boiling range of 77–158° F., residual oil recovered as a by-product of catalytic dehydrogenation of a $C_4$ hydrocarbon to produce a less saturated $C_4$ hydrocarbon and a propylene polymer. The subject matter of said application is incorporated herein as above and by reference.

The nematocide can also be dispersed in and on a solid carrier which is either neutral or acidic in character, such as sawdust, talc, diatomaceous earth, carbon, volcanic ash, vermiculite, and the like, which is then disked or plowed into or under the surface of the field or strewn into the furrow behind a conventional plowshare and thereafter covered by the succeeding furrow slice.

A preferred mode of operation comprises applying the nematocidal acid or ester in the form of an aqueous emulsion directly to the surface of the soil. Any suitable dispersing or emulsifying agent can be employed. The alkylated aryl polyether alcohols known commercially as Triton, the polyoxyethylene sorbitol esters known commercially as Atlox, and mercaptan-polyethylene oxide condensation products are among the emulsifying agents which are operable.

The nematocide, if liquid, can be emulsified directly with water. Or, if desired, it can first be dissolved in a substantially water-insoluble solvent, such as the aforementioned hydrocarbon solvents, and the resulting solution emulsified with water.

Regardless of the form in which the active ingredient is applied to the soil, it is done with compositions which deposit from 10 to 350 pounds of toxicant per acre, or, even, in certain instances such as with ornamental plants, up to 600 lbs. per acre, the exact amount depending upon a variety of factors, such as the organisms concerned, the temperature of the soil, the moisture content of the soil, and the like. For most purposes, a dosage of from 10 to 50 pounds of the toxic material is satisfactory.

Many previously known nematocidal compounds have been employed as soil fumigants. By virtue of their volatility they are capable of distributing themselves through the soil. However, because of their volatility, they also evaporate from the soil rather quickly, thus leaving the soil unprotected against recurring infestations of nematodes. Most of the acids and esters of my invention are toxic to nematodes primarily when in direct contact with the nematodes. Because of their low volatility, they remain in the soil for long periods of time thereby effecting control against newly-hatched nematodes or against a reoccurence from other sources. Some of the acids and esters show a limited amount of fumigant properties. A few, such as ethyl butyrate, propyl propionate, and butyl acetate, are most effective as fumigants.

The acids and esters of my invention can be used in admixture with each other, or with other nematocides. When a contact type nematocide is used in conjunction with one of a fumigant type, the advantages of both types are realized.

EXAMPLE 1

The toxicity of aqueous solutions of various chemicals against *Panagrellus redivivus* nematodes was tested by making up an aqueous solution containing approximately 1 percent of the chemical and placing the nematodes in the solution in an uncovered glass dish. If the chemical was not soluble to 1 percent, the saturated solution was used. Observations were made after 1, 2, 4, 7, and 23 hours, and estimations were made of the number of dead nematodes. Results are shown in the table below.

Table 1

|  | Percent Mortality, Hours | | | | |
| --- | --- | --- | --- | --- | --- |
|  | 1 | 2 | 4 | 7 | 23 |
| Dimethyl Sebacate, Run #1 | 50 | 100 | 100 | 100 | 100 |
| Dimethyl Sebacate, Run #2 | 100 | 100 | 100 | 100 | 100 |
| Sebacic Acid | A | Sv-A | 100 | 100 | 100 |
| Undecylenic Acid | 25 | 100 | 100 | 100 | 100 |
| Azelaic Acid, Run #1 | Sl-A | 100 | 100 | 100 | 100 |
| Azelaic Acid, Run #2 | 100 | 100 | 100 | 100 | 100 |
| Pimelic Acid | Sl-A | Sl-A | Sl-A | A | 10 |
| Diethyl Sebacate | Sl-A | Sl-A | A | 100 | 100 |
| Propionic Acid | 0 | 0 | 100 | 100 | 100 |
| Acrylic Acid (60% technical) | 50 | 50 | 65 | 100 | 100 |
| Lactic Acid | 0 | 0 | 0 | 0 | 100 |
| Butyl Lactate | 0 | 90 | 90 | 90 | 100 |
| Ethyl Lactate | 0 | 25 | 25 | 25 | 100 |
| Crotonic Acid | 100 | 100 | 100 | 100 | 100 |
| Diethyl Oxalate | 50 | 100 | 100 | 100 | 100 |
| Diisopropyl Oxalate | 0 | 0 | 0 | 0 | 100 |
| Malonic Acid | 0 | 0 | 50 | 100 | 100 |
| Diethyl Malonate | 0 | 75 | 100 | 100 | 100 |
| Maleic Acid | 0 | 0 | 0 | 100 | 100 |
| Fumaric Acid | 0 | 0 | 0 | 0 | 100 |
| Diethyl Maleate | 100 | 100 | 100 | 100 | 100 |
| Methyl Hydrogen Adipate | 100 | 100 | 100 | 100 | 100 |
| Diethyl Tartrate | 0 | 0 | 0 | 80 | 100 |

A = Affected.
Sl-A = Slightly affected.
Sv-A = Severely affected.

EXAMPLE 2

The toxicity of dilute aqueous solutions of various chemicals against *Panagrellus redivivus* was tested by the following procedure. Solutions containing 60 parts per million or less of the chemical were made by adding 12 mg. of the chemical to 200 ml. of water and allowing it to stand for 24 hours. In cases where the chemical was not soluble up to 60 parts per million, a saturated solution was produced instead.

Nematodes were then added to 25 ml. of the solution in an uncovered glass dish. Observations were made at the end of 1, 2, 4, 7, and 23 hours and estimations were made of the number of dead nematodes. The results are listed in the table below. The concentration of 60 parts per million is comparable to a concentration of 120 pounds per acre of soil.

Table 2

|  | Percent Mortality, Hours | | | | |
| --- | --- | --- | --- | --- | --- |
|  | 1 | 2 | 4 | 7 | 23 |
| Dimethyl Sebacate, Run #1 | A | 100 | 100 | 100 | 100 |
| Dimethyl Sebacate, Run #2 | 100 | 100 | 100 | 100 | 100 |
| Diethyl Sebacate, Run #1 | Sl-A | A | 100 | 100 | 100 |
| Diethyl Sebacate, Run #2 | Sl-A | Sl-A | A | 100 | 100 |

Sl-A = Slightly affected.
A = Affected.

The low phytotoxicity of these compounds is illustrated by the following example.

EXAMPLE 3

Bean and squash seeds were planted in separate 4-inch pots and after 8 days were thinned to two bean plants per pot and three squash plants per pot. At the time of thinning, each pot was watered with 200 ml. of a solution containing about 60 parts per million of dimethyl sebacate. Subsequent waterings were with tap water. After 18 days, the plants were large with green leaves. The root systems were found to be well developed when soil was washed from them.

EXAMPLE 4

Squash plants were transplanted into soil infected with the root knot nematode *Heterodera marioni*. Whenever the soil appeared dry the soil was watered with a solution containing approximately 60 parts per million of dimethyl sebacate until an amount not in excess of 60 parts per million based on the weight of the soil had been deposited in the soil. Thereafter tap water was used. Other squash plants, planted in samples of the same soil, were watered only with tap water. When the dirt was washed from the roots, the roots of the plants treated with dimethyl sebacate were large and fibrous and showed only a trace of galls, whereas the untreated roots were small and showed a moderate infestation of galls. The treated plants were large, whereas the untreated plants had split stems and were of medium size.

EXAMPLE 5

Dimethyl sebacate was mixed with soil to provide a concentration of 60 parts per million based on the weight of the soil. The soil was placed in 4-inch pots and squash and bean seeds were planted in the pots. The plants which germinated were green in color, indicating that the dimethyl sebacate is of low phytotoxicity.

EXAMPLE 6

Six drops of water were placed in a B. P. I. (Bureau Plant Industry) watch glass having a diameter of one inch. *Panagrellus redivivus* nematodes were pipetted into the watch glass. The watch glass was then placed in a stender dish that is 60 mm. in diameter and 28 mm. in height. A measured amount of chemical was placed in the stender dish and the dish was covered with a plate glass top. The ground glass seal was left ungreased. To kill the nemadoes, the chemical must first volatilize, then penetrate the water barrier and the nematodes. Observations were made after one, two, four, seven, and twenty-three hours had elapsed. If no movement of the nematodes was observed, it was listed as dead. In order to distinguish between a state of anesthesia and absence of life, the lid was removed from the stender dish when 100 percent of the nematodes appeared motionless, in order to permit the volatile chemical to be dissipated to the surrounding atmosphere. Water was added to the capacity of the watch glass (1 ml.), in order to prevent evaporation to dryness. At subsequent counts it was determined whether any of the nematodes had revived. Revival was considered an indication of anesthesia, and nematocidal properties were attributed only to the chemicals which caused the death of at least a portion of the nematodes. The disappearance of the state of anesthesia was apparent at the end of two hours in all cases. Results are shown in the table below.

It will be noted that where a compound exhibited anesthetic effect, larger retention thereof would have exhibited a killing effect.

Table 3

| Chemical | ml., Chemical | Percent Mortality, Hours | | | | |
|---|---|---|---|---|---|---|
| | | 1 | 2 | 4 | 7 | 23 |
| Butyl Acetate | 0.1 | Sl-A | Sl-A | *100 | 98 | 99 |
| | 0.1 | Sl-A | Sv-A | *100 | 100 | 100 |
| | 0.05 | Sl-A | Sl-A | *100 | 98 | 100 |
| | 0.05 | U | Sv-A | *100 | 100 | 100 |
| | 0.01 | U | Sl-A | Sl-A | Sl-A | 0 |
| | 0.01 | Sl-A | A | A | Sl-A | 10 |
| Ethyl Butyrate | 0.1 | *100 | 100 | 75 | 75 | 25 |
| | 0.1 | *100 | 100 | 100 | 90 | 90 |
| | 0.05 | *100 | 100 | 80 | 70 | 25 |
| | 0.05 | Sv-A | *100 | 100 | 100 | 100 |
| | 0.01 | *100 | 50 | 25 | 25 | 0 |
| | 0.01 | Sl-A | Sl-A | U | U | 0 |
| Propyl Propionate | 0.1 | 90 | *100 | 100 | 100 | 100 |
| | 0.1 | 98 | *100 | 100 | 100 | 100 |
| | 0.05 | 50 | 90 | *100 | 100 | 100 |
| | 0.05 | 95 | *100 | 100 | 100 | 100 |
| | 0.01 | 50 | 50 | 50 | 50 | 50 |
| | 0.01 | U | U | U | U | 0 |

*=BPI watch glass removed from jar.
Sl-A=Slightly affected.
A=Affected.
Sv-A=Severely affected.
U=Unaffected.

EXAMPLE 7

8-inch cubic wooden boxes were filled with soil infested with root knot nematodes *Heterodera marioni*. Two boxes were left untreated as controls. The other boxes were treated in one of two different ways with 1.5 g. of dimethyl sebacate, which is equivalent to 144 lbs. per acre. The first method consisted of pouring onto the soil 250 ml. of an aqueous emulsion made with 1.5 g. of dimethyl sebacate and 1 g. of Atlox 1045A (polyoxyethylene sorbitol ester), and then working it into the top few inches of soil. The second method consisted of adding 1.5 g. of dimethyl sebacate to water, pouring the mixture on top of the soil and washing it in by the application to the soil of enough additional water to bring the total amount of water to 250 ml. Squash seeds were then planted in the box. After germination, seedlings were thinned to four plants in each box. Six weeks later the plants were removed from the soil, the size of the plant and root system were noted, and the number of galls on the roots counted. The number of galls on the plants grown in the treated boxes was very small, and all of them were on roots at the bottom of the box where the concentration of the chemical would be expected to be less. The results are tabulated below.

Table 4

| Method of Treatment | Size of Plant | Size of Root System | Number of Galls | Root Rating a |
|---|---|---|---|---|
| Emulsion, Box #1 | large | medium | 0 | 0 |
| Emulsion, Box #2 | do | do | b 4 | 1 |
| Water Wash, Box #1 | medium | do | 0 | 0 |
| Water Wash, Box #2 | do | do | c 9 | 1 |
| Untreated, Box #2 | large | do | d 47 | 2 | a 0 = no galls; #1 = trace of galling; #2 = slight galling.
b At depth of 5 inches.
c At depth of 6 inches.
d Throughout root system.

Herein and in the claims the term "aliphatic" refers to acyclic structure as distinguished from a cyclic structure.

The esters described herein are usually prepared by reaction of a saturated alcohol with the described carboxylic acid.

Reasonable variation and modification are possible within the scope of the foregoing disclosure and the appended claims to the invention, the essence of which is that carboxylic acids, their esters of saturated alcohols, and hydroxy-substituted derivatives, as described, have been set forth as nematocides; that a method for killing nematodes has been set forth and that the method, employing the said nematocides, as described, is suitable for treatment of soils even when said soils contain plants.

I claim:

1. A method of controlling nematodes which comprises treating nematode-infested soil with an effective nematocidal amount of at least one of the compounds selected from the group of compounds having the following structural characteristics:

(I)

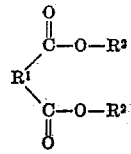

and (II)

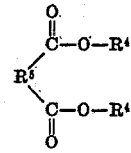

and (III)

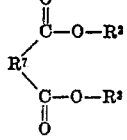

wherein $R^1$ is a divalent aliphatic hydrocarbon radical containing 5-9 carbon atoms; $R^2$ is selected from the group consisting of hydrogen and a saturated hydrocarbon radical containing 1-6 carbon atoms; $R^4$ is selected from the group consisting of hydrogen and a saturated hydrocarbon radical containing 1-3 carbon atoms; $R^5$ is a divalent aliphatic hydrocarbon radical containing 2-4 carbon atoms; $R^7$ is a divalent aliphatic hydrocarbon radical containing a single carbon atom; the radicals represented by $R^2$ can be different; the radicals represented by $R^4$ can be different; and hydroxy-substituted derivatives of said compounds, the hydroxy substitution being in the portion of the compound resulting from the acid.

2. The method of claim 1 wherein the compound selected is dispersed in an adjuvant and the adjuvant is an olefinic hydrocarbon.

3. The method of claim 1 wherein the compound selected is dispersed in an adjuvant and the adjuvant is an aqueous emulsion.

4. The method of claim 1 wherein the compound selected is dispersed in an adjuvant and the adjuvant is an isoparaffinic hydrocarbon.

5. The method of claim 4 wherein said isoparaffinic hydrocarbon is obtained by the alkylation of an isoparaffin with an olefin.

6. The method of claim 1 wherein the compound selected is dispersed in an adjuvant and the adjuvant is a normal hydrocarbon containing not more than 16 carbon atoms.

7. The method of claim 1 wherein the compound is dimethyl sebacate.

8. The method of claim 1 wherein the compound is azelaic acid.

9. The method of claim 1 wherein the compound is a sebacic acid ester.

10. The method of claim 1 wherein the compound is a sebacic acid.

11. The method of claim 1 wherein the compound is an azelaic acid ester.

12. The method of claim 1 wherein the compound is diethyl sebacate.

13. The method of claim 1 wherein the compound is maleic acid.

14. The method of claim 1 wherein the compound is fumaric acid.

15. The method of claim 1 wherein the compound is malonic acid.

16. The method of claim 1 wherein the compound is a malonic acid ester.

17. The method of claim 1 wherein the compound is diethyl maleate.

18. A method according to claim 1 wherein the active ingredient compounds are applied to the soil in an amount in the range of 10–350 pounds per acre.

19. The method of claim 1 wherein the compound selected is dispersed in an adjuvant and the adjuvant is water.

20. A method of controlling nematodes which comprises treating nematode-infested soil with an effective nematocidal amount of undecylenic acid.

21. A method of conrolling nematodes which comprises treating nematode-infested soil with an effective nematocidal amount of undecylenic acid ester in which the radical replacing the hydrogen of the acid is a saturated hydrocarbon radical containing 1–6 carbon atoms.

22. A method of controlling nematodes which comprises treating nematode-infested soil with an effective nematocidal amount of lactic acid.

23. A method of controlling nematodes which comprises treating nematode-infested soil with an effective nematocidal amount of lactic acid ester in which the radical replacing the hydrogen of the acid is a saturated hydrocarbon radical containing 1–6 carbon atoms.

24. A method of controlling nematodes which comprises treating nematode-infested soil with an effective nematocidal amount of crotonic acid.

25. A nematocidal composition of matter containing dispersed in a nematocidal adjuvant aqueous emulsion an effective amount of at least one of the compounds selected from the group of compounds having the following structural characteristics:

(I)

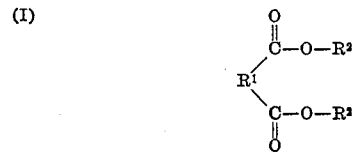

and (II)

and (III)

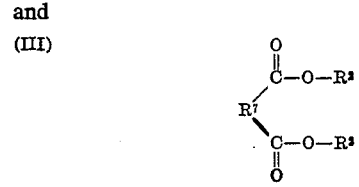

wherein $R^1$ is a divalent aliphatic hydrocarbon radical containing 5–9 carbon atoms; $R^2$ is selected from the group consisting of hydrogen and a saturated hydrocarbon radical containing 1–6 carbon atoms; $R^4$ is selected from the group consisting of hydrogen and a saturated hydrocarbon radical containing 1–3 carbon atoms; $R^5$ is a divalent aliphatic hydrocarbon radical containing 2–4 carbon atoms; $R^7$ is a divalent aliphatic hydrocarbon radical containing a single carbon atom; the radicals represented by $R^2$ can be different; the radicals represented by $R^4$ can be different; and hydroxy-substituted derivatives of said compounds, the hydroxy substitution being in the portion of the compound resulting from the acid.

26. An emulsifiable nematocidal composition of matter containing dispersed in a nematocidal adjuvant consisting essentially of an emulsifying agent and a hydrocarbon an effective nematocidal amount of at least one of the compounds selected from the group of compounds having the following structural characteristics:

(I)

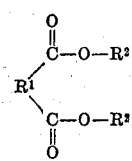

and (II)

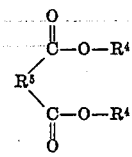

and (III)

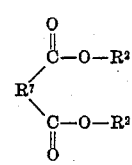

wherein $R^1$ is a divalent aliphatic hydrocarbon radical containing 5–9 carbon atoms; $R^2$ is selected from the group consisting of hydrogen and a saturated hydrocarbon radical containing 1–6 carbon atoms; $R^4$ is selected from the group consisting of hydrogen and a saturated hydrocarbon radical containing 1–3 carbon atoms; $R^5$ is a divalent aliphatic hydrocarbon radical containing 2–4 carbon atoms; $R^7$ is a divalent aliphatic hydrocarbon radical containing a single carbon atom; the radicals represented by $R^2$ can be different; the radicals represented by $R^4$ can be different; and hydroxy-substituted derivatives of said compounds, the hydroxy substitution being in the portion of the compound resulting from the acid, the said hydrocarbon being selected from the group consisting of a liquid olefinic hydrocarbon, a liquid isoparaffinic hydrocarbon and a liquid normal hydrocarbon containing not more than 16 carbon atoms.

27. A nematocidal composition of matter containing dispersed in a nematocide adjuvant an effective amount of azelaic acid ester in which the hydrogen of each of the carboxyl groups is replaced by a saturated hydrocarbon radical of 1 to 6 carbon atoms as an active nematocidal ingredient, the said adjuvant being selected from the group consisting of a liquid olefinic hydrocarbon, a liquid isoparaffinic hydrocarbon and a liquid normal hydrocarbon containing not more than 16 carbon atoms.

28. A nematocidal composition of matter containing dispersed in a nematocide adjuvant an effective amount of undecylenic acid ester in which the hydrogen of the carboxyl group is replaced by a saturated hydrocarbon radical of 1 to 6 carbon atoms as an active nematocidal ingredient, the said adjuvant being selected from the group consisting of a liquid olefinic hydrocarbon, a liquid isoparaffinic hydrocarbon and a liquid normal hydrocarbon containing not more than 16 carbon atoms.

29. A nematocidal composition of matter containing dispersed in a nematocide adjuvant an effective amount of dimethyl sebacate as an active nematocidal ingredient, said adjuvant being selected from the group consisting of a liquid olefinic hydrocarbon, a liquid isoparaffinic hydrocarbon and a liquid normal hydrocarbon containing not more than 16 carbon atoms .

30. A nematocidal composition of matter containing dispersed in a nematocide adjuvant an effective amount of diethyl sebacate as an active nematocidal ingredient, said adjuvant being selected from the group consisting of a liquid olefinic hydrocarbon, a liquid isoparaffinic hydrocarbon and a liquid normal hydrocarbon containing not more than 16 carbon atoms.

31. A nematocidal composition of matter containing dispersed in a nematocide adjuvant an effective amount of an aliphatic dicarboxylic acid containing 1–11 carbon atoms to the molecule as an active nematocidal ingredient, the said adjuvant being selected from the group consisting of a liquid olefinic hydrocarbon, a liquid isoparaffinic hydrocarbon and a liquid normal hydrocarbon containing not more than 16 carbon atoms.

References Cited in the file of this patent

UNITED STATES PATENTS

| | | |
|---|---|---|
| 2,218,181 | Searle | Oct. 15, 1940 |
| 2,274,267 | Granett | Feb. 24, 1942 |
| 2,325,791 | Moore | Aug. 3, 1943 |
| 2,333,666 | Moore | Nov. 9, 1943 |
| 2,396,012 | Jones | Mar. 5, 1946 |

OTHER REFERENCES

Pears: Perfumery and Ess. Oil Record, vol. 44, Mar. 5, 1933, p. 85.
Chem. Absts., 17, 533$_5$ (1923).
Chem. Absts., 34 1995 (2), 1940.
Chem. Absts., 37 1701 (5), 1943.
Chem. Absts., 37 4685 (2), 1943.